United States Patent [19]
Medney

[11] 3,843,303
[45] Oct. 22, 1974

[54] APPARATUS FOR MAKING RESIN BONDED GLASS FIBER ARTICLES

[76] Inventor: Jonas Medney, 3504 Woodward St., Oceanside, N.Y. 11572

[22] Filed: July 19, 1971

[21] Appl. No.: 163,993

Related U.S. Application Data

[62] Division of Ser. No. 780,014, Nov. 29, 1968, abandoned.

[52] U.S. Cl. ............... 425/395, 425/396, 425/397, 425/412
[51] Int. Cl. ........................................... B28b 11/00
[58] Field of Search ....... 425/396, 397, 382 N, 412, 425/394–395; 28/1 CL; 264/DIG. 81, DIG. 53; 140/71

[56] References Cited
UNITED STATES PATENTS

| | | | |
|---|---|---|---|
| 2,427,508 | 9/1947 | Raspet | 140/71 |
| 2,903,388 | 9/1959 | Jonke et al. | 264/DIG. 53 |
| 3,039,169 | 6/1962 | Frickert, Jr. et al. | 264/DIG. 81 |
| 3,231,647 | 1/1966 | Oesterheld | 425/396 X |
| 3,296,055 | 1/1967 | Wilkins | 425/397 X |

Primary Examiner—Richard B. Lazarus
Attorney, Agent, or Firm—Leonard H. King

[57] ABSTRACT

Apparatus is provided for molding a resin bonded glass fiber article. The apparatus includes a plurality of means for supplying separate bundles of glass fibers in cooperation with a plurality of feed eyes one of which is associated with each of the glass fiber supply means. Drive means displace the feed eyes along paths that are oppositely oblique to each other in order to position the glass fiber bundles within mold means that have recesses positioned adjacent the paths of the feed eyes.

5 Claims, 22 Drawing Figures

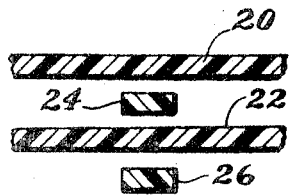 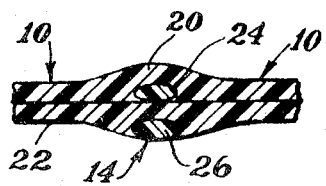 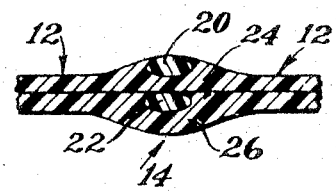
*FIG. 3*      *FIG. 4A*      *FIG. 4B*
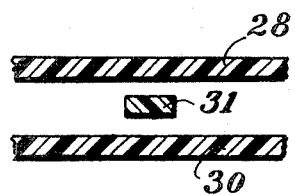 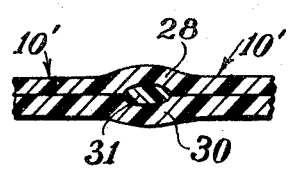 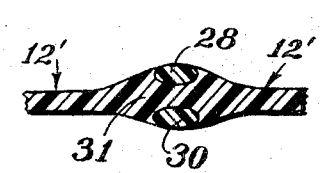
*FIG. 5*      *FIG. 6A*      *FIG. 6B*
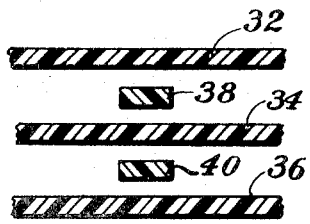 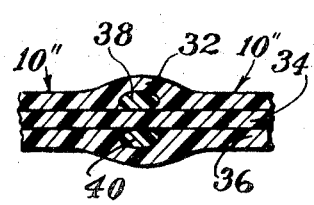 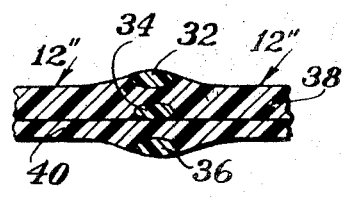
*FIG. 7*      *FIG. 8A*      *FIG. 8B*
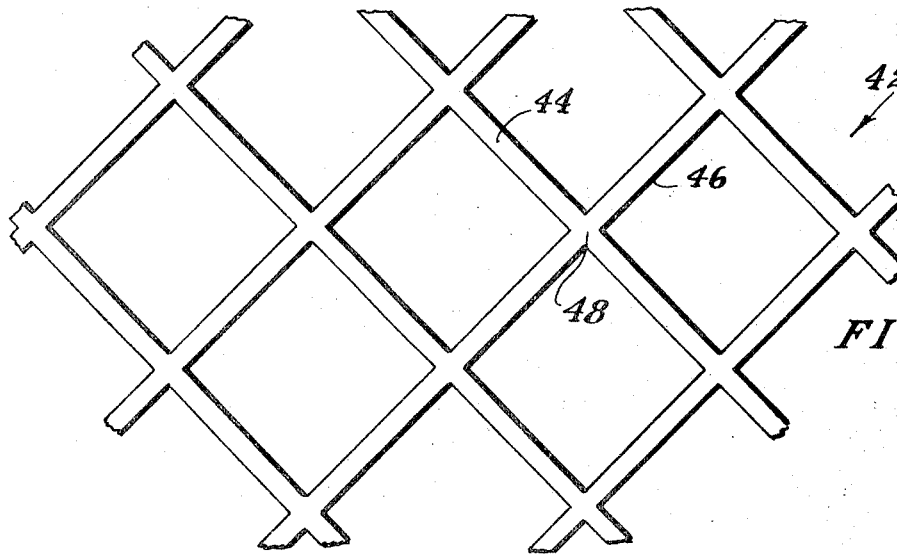
*FIG. 9*

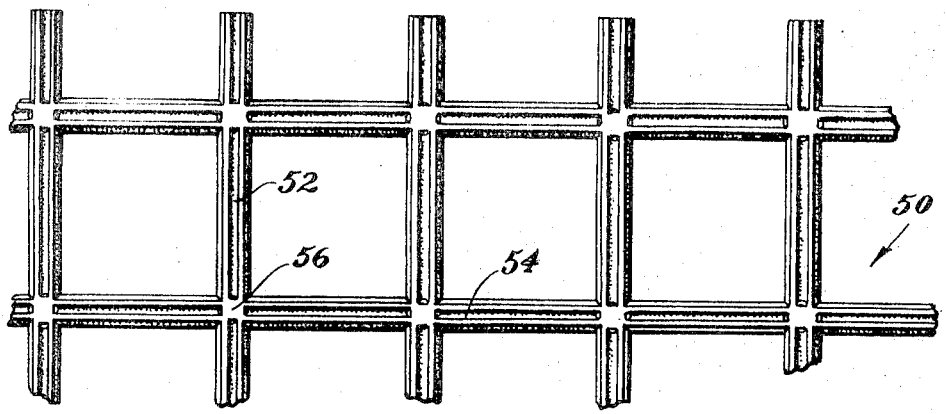
FIG. 10
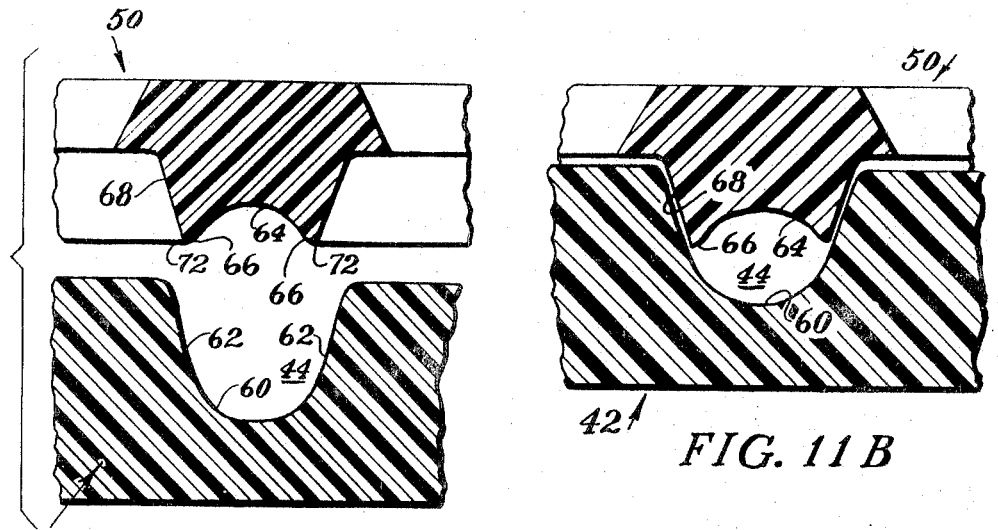
FIG. 11A
FIG. 11B
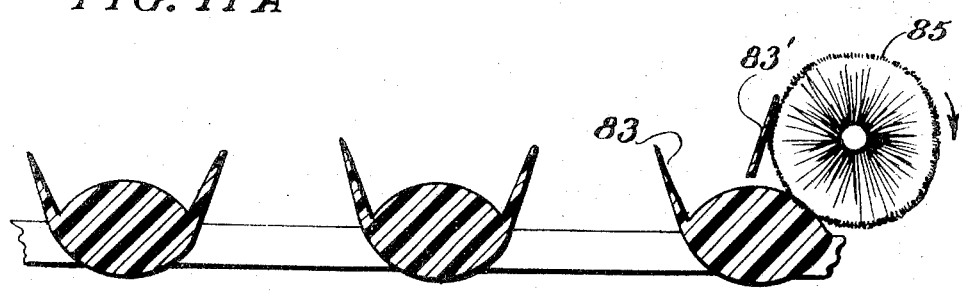
FIG. 18

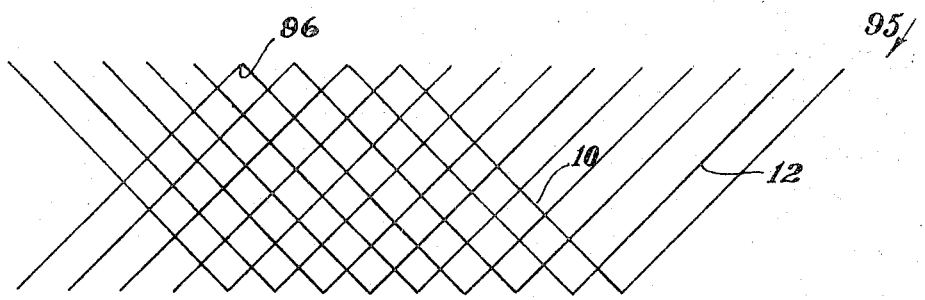
FIG. 14
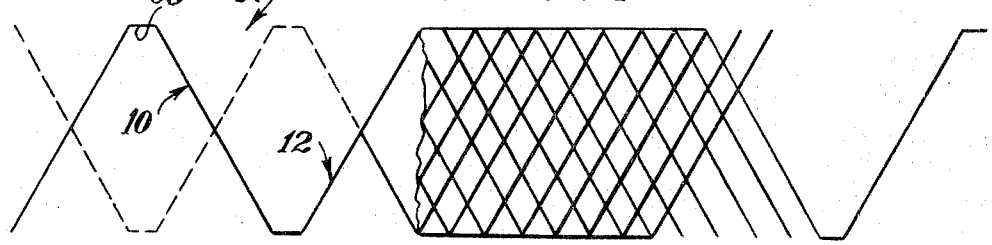
FIG. 15
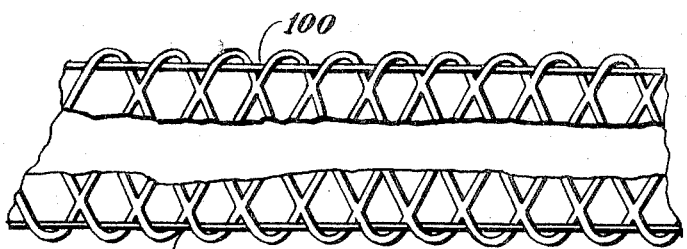
FIG. 16
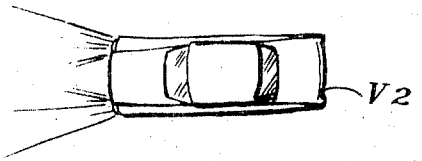
FIG. 17

APPARATUS FOR MAKING RESIN BONDED GLASS FIBER ARTICLES

This is a division of application Ser. No. 780,014 filed Nov. 29, 1968 and now abandoned.

This invention relates to a glass fiber fence structure.

BACKGROUND OF THE INVENTION

A commonly used fence material is the interlinked wire type usually referred to as a chain link fence. This link fence has a number of disadvantages. For example, it is normally made of steel and therefore is subject to corrosion, particularly in environments with corrosive agents in the air, such as at the seashore and near industrial plants which vent fumes, such as steel mills. Attempts have been made to overcome this problem by coating the steel wire with zinc, vinyl resin, or substituting aluminum wire. These solutions, despite their inherently high cost, are not infallible as breaks in the wire coating can occur permitting corrosion to take place. Further, the chain link fence requires the services of several men and heavy equipment to install as the fence material must be stretched. The requirement for tensioning dictates that the supporting posts must be sufficiently rigid and securely anchored in the soil to resist the high tensile forces exerted by the fence. The chain link steel fence suffers a serious economic disadvantage, namely, the material is heavy, thereby incurring significant freight charges in shipment.

As a solution to these problems there is disclosed hereinafter a fence material which is formed of resin bonded glass filaments which are interlocked to provide great stength with a minimal quantity of glass and rsin. The construction of the structure of this invention is such that the labor and the material involved to produce a fence of at least equal structural strength to that of a given steel chain link fence makes it economically competitive therewith. As will be detailed hereinafter, the structure of the glass filament fence is light in weight and flexible, permitting sections to be rolled for shipment, thus minimizing shipping costs. When unrolled, the fence section is rigid and can be readily installed by one person. The supporting fence posts, not being under tension, can be relatively light.

The fence of this invention is corrosion-proof. The material offers many decorative advantages. For example, it is available in a range of colorfast hues. It may be opaque or by proper matching of indices of refraction between glass and resin may be made transparent. Light reflecting materials may be added to the resin and/or glass. The shape of the openings may be varied by varying the ratio between conjugate diagonals of the diamond pattern to provide barriers of architectural interest. The bundles may be oriented to change the aspect ratio or to act as louvers. This latter construction is desirable in highway barrier fence, as will be described hereinafter.

SUMMARY OF THE INVENTION

The bundles of resin-impregnated glass filaments are molded so that at the joints the glass forms a knuckle to mechanically interlock and resin bond transverse bundles at each crossing. The glass filament bundles and resin are compression molded by means of a pair of mating mold members. Bundles of glass filaments are laid in a herringbone pattern with at least one bundle captured by a pair of bundles running in a transverse direction. This interlocking feature provides great strength and insures shape retention.

Accordingly, it is an object of this invention to provide an improved fence.

It is a particular object of this invention to provide a resin bonded filament fence.

It is a different object of this invention to provide a glass fiber fence with a selvage.

A further object of this invention is to provide a fence which may be readily cut to size.

Still another object of this invention is to provide a lightweight fence of improved construction.

A still different object of this invention is to provide an interlocked glass filament mesh structural member.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

BRIEF DESCRIPTION OF THE DRAWING

FIG. 3 is a fragmentary, exploded view of a joint or knuckle of one embodiment of this invention;

FIGS. 4A and 4B are sectional views of the embodiment of FIG. 3 after molding and taken 90° apart;

FIG. 5 is a fragmentary, exploded view of a joint or knuckle of an alternative embodiment of this invention;

FIGS. 6A and 6B are sectional views of the embodiment of FIG. 5 after molding and taken 90° apart;

FIG. 7 is a fragmentary, exploded view of a joint or knuckle of still another, alternative embodiment of this invention;

FIGS. 8A and 8B are sectional views of the embodiment of FIG. 7 after molding and taken 90° apart;

FIG. 9 is a fragmentary plan view of a first portion of a mold used to form the present invention;

FIG. 10 is a fragmentary plan view of a second portion of a mold used to form the present invention;

FIGS. 11A and 11B are a transverse, exploded and assembled sectional view of the mold portions shown in FIG. 9 and in FIG. 10 to illustrate flash removal means;

FIG. 14 is a scematic elevational view illustrating a fence according to this invention wherein one form of edge is provided;

FIG. 15 is a schematic elevational view illustrating a fence according to this invention wherein a different form of edge is provided;

FIG. 16 is a schematic elevational view illustrating a fence according to this invention wherein an integral tensioning member is included;

FIG. 17 is a schematic plan view of a fence according to this invention and which is utilized as a roadway divider and barrier; and FIG. 18 is a schematic showing of a molding fin being brushed off the molding by a rotary brush.

DESCRIPTION OF THE BEST EMBODIMENT

Figure 1:
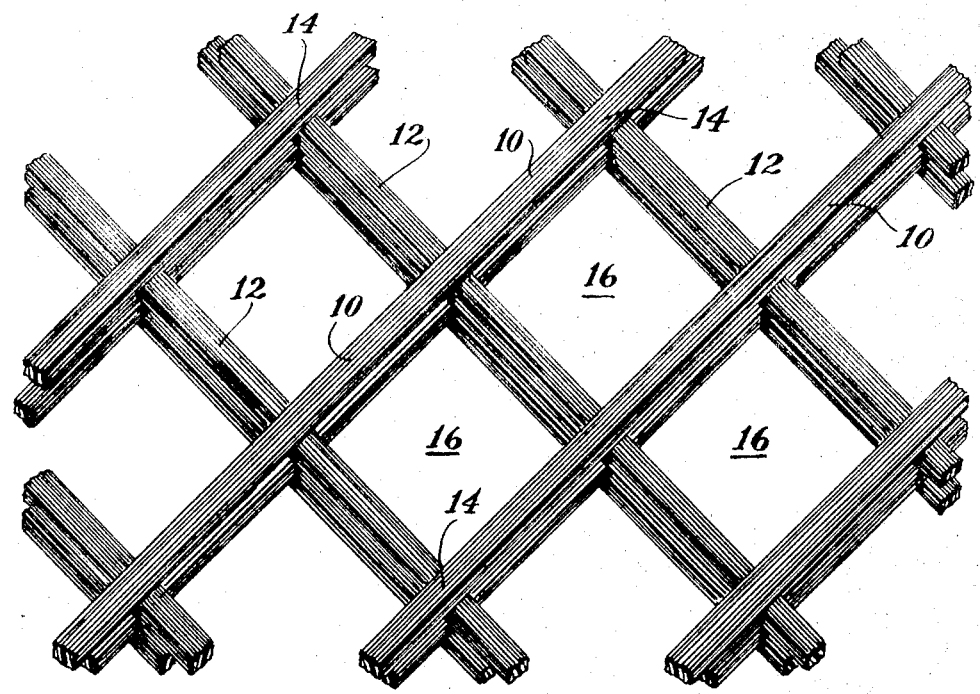
FIG. 1 is a pictorial view of a section of the assembled fence material just prior to molding.

Referring now to FIG. 1, there is shown a fragmentary section of a typical structure embodying the concept of this invention. This strucutre is comprised of a plurality of longitudinal bundles of glass filaments 10 and a plurality of transverse bundles of glass filaments 12. The intersections of the bundles 10 and 12 are designated as joints or knuckles 14 while the areas bounded by adjacent bundles 10 and 12 are designated as openings 16. For the purpose of this discussion the bundles 10 and 12 are comprised of 25,000 filaments each having a diameter of approximately 0.00036 inches. After molding and as shown in FIG. 2, the longitudinal bundles 10 are interlocked with transverse bundles 12 at the joints 14.

Before continuing with the description of this invention it should be noted that, for purposes of simplification, the bundles 10 and 12 will be described as being comprised of one or more bundles and to this end each bundle will bear a different reference character.

However, after molding the bundles will be an homogeneous mass both at the joints and between adjacent joints even though the drawings show separate cross hatching.

Figure 2:
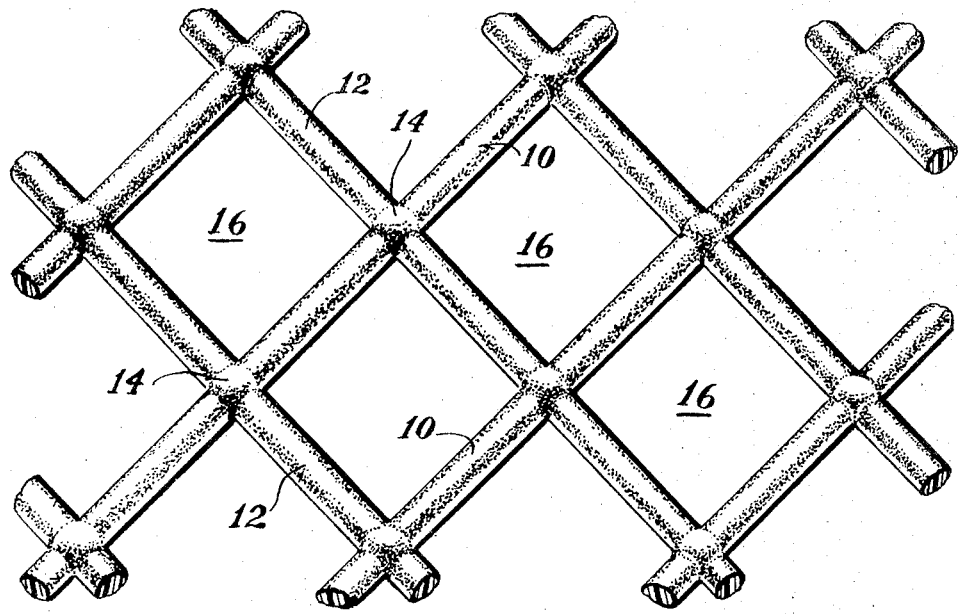
FIG. 2 is a pictorial view of a section of the fence after it is completed by molding.

FIGS. 3, 4A and 4B illustrate the preferred, minimum number of bundles used to form the structure shown in FIGS. 1 and 2. In this embodiment the longitudinal bundles 10 are formed by a pair of bundles 20 and 22 that are in the same vertical plane. The transverse bundles 12 are formed of a pair of bundles 24 and 26 that are also in a common vertical plane. Thus, this embodiment is comprised of four bundles that alternate in direction and which are interleaved at the joints that form the intersections. The molding operation forms bundles 20 and 22 into the homogeneous longitudinal bundles 10 while, at the same time bundles 24 and 26 are formed into homogeneous transverse bundles 12.

FIGS. 5, 6A and 6B illustrate an embodiment of the present invention wherein only three bundles, the minimum number permissible, are used. In this embodiment each longitudinal bundle 10' is comprised of upper and lower longitudinal bundles 28 and 30 between which a single transverse bundle 31 is sandwiched at the joints. Because of this arrangement the longitudinal bundles 10' will have a cross sectional area twice that of the transverse bundles 12' unless provisions in the mold members described subsequently are made to compensate for this.

FIGS. 7, 8A and 8B are used to illustrate the embodiment of this invention wherein an odd number of bundles greater than the minimum of three are used to form the joints. The longitudinal bundles 10'' are comprised of individual longitudinal bundles 32, 34 and 36 between which individual transverse bundles 38 and 40 of longitudinal bundles 12'' are interleaved to form the joints. It will be appreciated that the use of an odd number of bundles provides a product having a somewhat more uniform appearance when viewed from opposite sides.

In general, the greater the number of bundles the stronger the structure. Likewise, whereas a bundle having a cross section of 0.015 square inch of glass has been found suitable for replacement of conventional chain link fences, where the fence is to be used as, say a highway lane divider and is intended to catch vehicles that cross the median, then a heavier construction would be desirable. By way of comparison a steel chain link fence would have tensile strength of 70,000 p.s.i. compared to an ultimate tensile strength of 100,000 p.s.i. for the glass filament of equal cross section.

An interesting aspect of the device is that it is highly resilient to impact, such as from a ball or other missile, and if the ultimate tensile strength is not exceeded will rebound and resume its initial condition without detriment to its appearance. This is contrary to the action of the chain link fence which tends to permanently deform.

A two-part mold means used to form any of the previously described embodiments is shown in FIGS. 9, 10 and 11. A female mold member 42 (FIG. 9) is provided with a plurality of longitudinal and transverse grooves 44 and 46, respectively, that intersect at recesses 48. Similarly, the male mold member 50 (FIG. 10) is provided with longitudinal and transverse grooves 52 and 54, respectively, that intersect at recesses 56. It will be appreciated that the location and quantity of grooves and recesses in each mold member is identical and that when the longitudinal and transverse bundles 10 and 12 respectively are deposited in the appropriate grooves in the female mold member 42, the bundles will cross each other, interleaved as described above, at the recesses. Subsequent application of heat and pressure in a conventional manner will conform the bundles to the mold shape.

Particular attention is directed to FIGS. 11A and 11B wherein means are provided to remove the flash that is normally associated with the type of molding apparatus described above. FIG. 11 is a transverse sectional view that shows a typical groove cross section defined by the juxtaposition of longitudinal grooves 44 and 52 in mold members 42 and 50, respectively. Considering first the mold member 42, which may be designated as a female mold member, the groove 44 is substantially arcuate at its base portion 60 and includes slightly convex side walls 62 that diverge upwardly. The second mold member 50, which may be considered as a male mold member, is defined by an arcuate base recess 64 that terminates in angled flat portions 66. Upwardly diverging concave walls 68 extend from the flat portions 66 to a transverse shoulder 70 that rests on the top surface of the first mold member 42 in the assembled condition.

The maximum, transverse width dimension at the juncture 72 of flat portions 66 and concave walls 68 is only slightly less, say in the order of 0.001 inch, than the minimum width dimension between the diverging convex walls 62. Thus, in effect, junctures 72 act as knife edges to sever the flash (FIG. 11B) that results from excess resin being squeezed out during molding. Generally the flash falls off. In the event a small fin 83 is left it may be easily removed by running a rotary brush 85 over the article, as shown in FIG. 18, to flick the fin 83' off.

Figure 12:
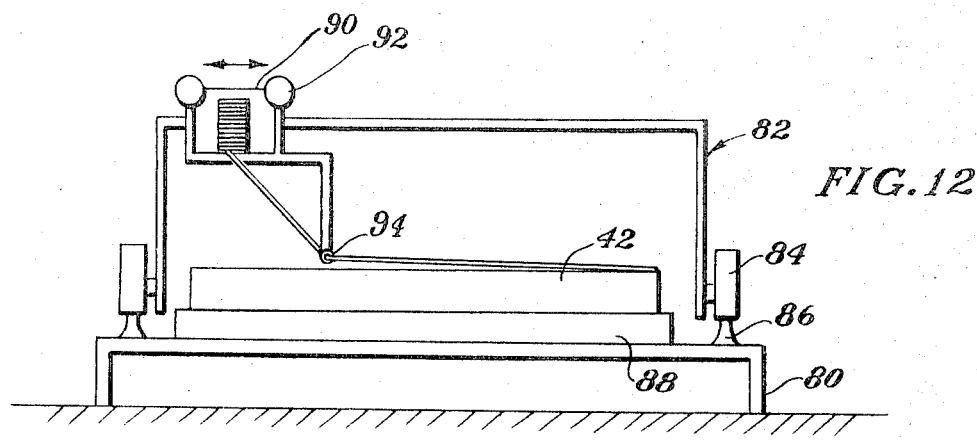
FIG. 12 is a schematic elevational view of additional structure that may be used to fabricate a fence in accordance with this invention.
Figure 13:
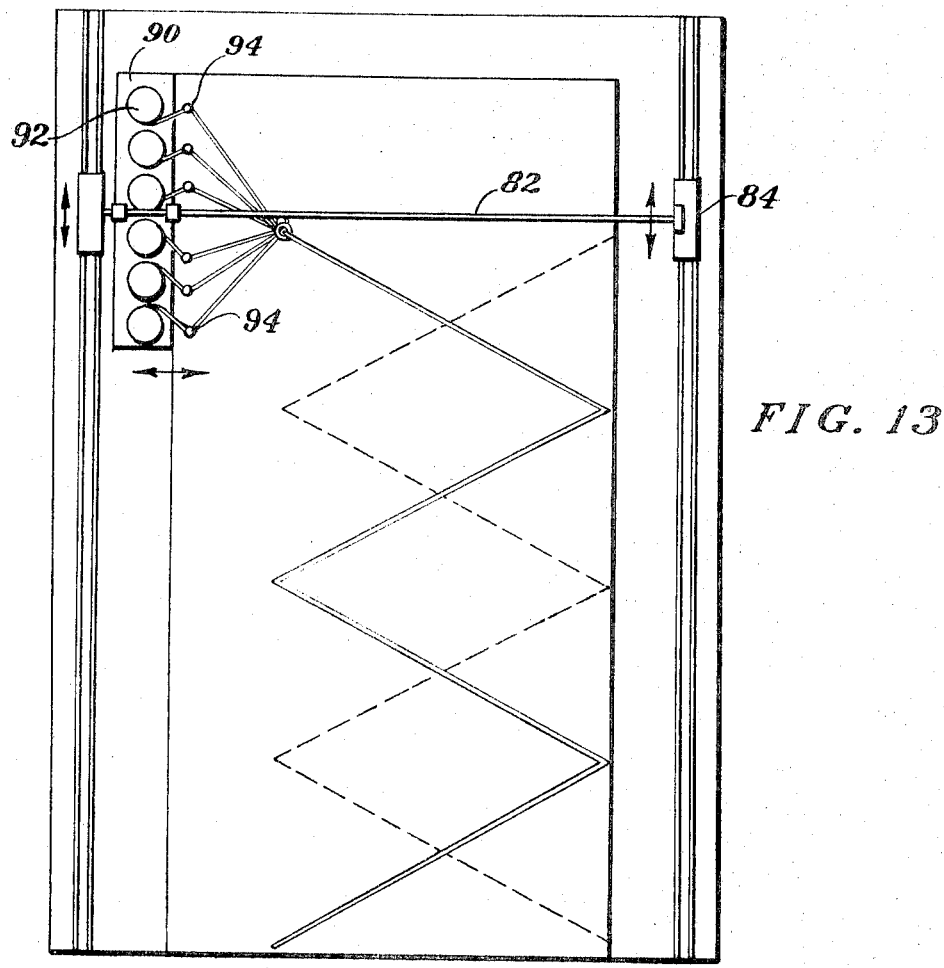
FIG. 13 is a schematic plan view of the structure shown in FIG. 12.

Structure to form the fence described above is illustrated in FIGS. 12 and 13 and comprises a frame member 80 that supports a first carriage 82 for longitudinal movement with respect thereto. The first carriage 82 may be provided with rollers or wheels 84 that ride on longitudinally disposed tracks 86. Further, the first carriage 82 straddles the mold member 42 described previously which is positioned on a bed 88 or a suitable portion of the machine frame. A second carriage 90 is mounted on the first carriage 82 and is movable transversely with respect to the movement of the first carriage. The second carriage 90 supports a plurality of spools 92 that define the filament supply source. The filament from each spool 92 is fed through its own associated feed eye 94 that is rigidly supported on the second movable carriage 90. Therefore, it will be seen in FIGS. 12 and 13 that as the first carriage 82 moves longitudinally and the second carriage 90 simultaneously moves transversely, then the feed eyes 94 carrying the filaments will move obliquely at equal and opposite angles as the second carriage 90 shuttles back and forth. The feed eyes 94 are programmed to travel at a speed which will lay the filaments down in the longitudinal and transverse grooves described in connection with the mold members of FIGS. 9 and 10. The feed eyes 94 may be simply programmed by controlling the rate of travel of the first and second carriages 82 and 90, respectively. While not illustrated in detail, any conventional means may be used to actuate the carriages 82 and 90 at the prescribed rates of speed. For example, the first carriage 82 may be motor driven through a rack and gear combination while the second carriage 90 may be actuated by a lead screw type of mechanism that is suitably coupled to the drive motor (not shown). After the layup of the filaments is completed the second mold member is brought into engagement with the first mold member as described above in order to form the end product.

FIG. 14 illustrates a typical fence 95 formed by the combined motions of the carriages just described. The feed eyes 94, in their travel in one oblique direction, lay down the plurality of longitudinal bundles 10 and in their return travel in the opposite, oblique direction lay down a plurality of transverse bundles 12. Previously in the description no connection between the longitudinal and transverse bundles 10 and 12 was mentioned. However, by reference to FIG. 14 it will be seen that the juncture 96 of the two bundles 10 and 12 is a sharp corner resulting from the reverse movement of the feed eyes 94. Such a fence construction does not provide selvage. Where a more finished edge is required in a fence, the carriage apparatus can be programmed to produce the structure shown in FIG. 15. All of the carriage motions described with respect to the FIG. 14 fence are the same for the FIG. 15 fence 97 but in addition, the second carriage 90 is programmed or indexed to move longitudinally for a short distance at the end of its oblique travels in each direction. Thus, a plurality of longitudinal bundles 10 are laid down in a first obligue direction, then the second carriage 90 moves to lay down bundles parallel to the direction of movement of the first carriage 82 to define junctures 98 before proceeding along its second oblique path of travel. The short parallel movement of the second carriage 90 is repeated when the feed eyes 94 return to the opposite side so that short lengths 98 of bundles are formed along the two parallel edges in order to provide selvage. It is to be understood that where the second carriage 90 is programmed to lay up short lengths 98 of bundles parallel to the major axis of the fence, then the mold member must be suitably altered to accommodate these sections.

Where N is the number of openings across the width of the fence, the 2N feed eyes 94 are used. Where it is required that selvage be included, then 2N + 1 feed eyes 94 are used.

FIG. 16 is used to illustrate another alternative embodiment of the invention wherein an elongated tensioning member 100 is inserted at the juncture 96 or 98 of the longitudinal and transverse bundles. The tensioning members 100 are threaded, in any suitable manner, between the longitudinal and transverse bundles during the layup. It is to be understood, of course, that the mold members would have to be suitably formed to accommodate the tensioning members which extend the length of the fence.

The fence comprising this invention may be used as a roadway divider and barrier. In FIG. 17 there is shown a fence 110 having bundles of filaments 112 oriented so as to change the aspect ratio or to act as louvers. Thus, the headlights of vehicle $V_1$ cannot penetrate to the opposite roadway and interfere with the driving of $V_2$. Similarly, the headlight of $V_2$ cannot penetrate the fence 110 and thereby interfere with the driving of $V_1$. The mold members used to form a fence of this nature are provided with suitably shaped grooves having a length, width and depth required to form bundles of substantially rectangular and angularly oriented cross section.

Accordingly, it will be appreciated that the present invention provides a low cost fence of resin bonded glass filament bundles that is inexpensive to manufacture and which may be readily installed with a minimum of cost. A fence of this invention is corrosion proof and can be made attractive by the addition of colored resin. Interesting architectural designs may readily be achieved by suitably shaping the mold members and by programming the layup structure accordingly.

Having thus described the best embodiment presently contemplated, it is to be understood that various changes and modifications may be made by those skilled in the art without departing from the spirit of the invention.

What I claim as new and desire to secure by Letters Patent is:

1. Apparatus for molding a resin bonded glass fiber article comprising:
   a. a plurality of means for supplying glass fibers;
   b. a plurality of feed-eyes each one of which is arranged to carry glass fibers from said means for supplying glass fibers;
   c. drive means adapted to move said feed-eyes along paths that are oblique to each other; and
   d. mold means positioned adjacent to the paths of said feed-eyes for receiving the glass fibers carried thereby, said mold means being comprised of an upper and lower member each of which has a plurality of substantially U-shaped grooves transversely intersecting each other whereby said grooves are combined to form the mold cavity, said grooves in one of said mold members having a marginal lip, said grooves in said other mold member having a marginal recess for receiving said lip, said lip and said recess being slightly spaced from each other during the molding operation whereby the resulting flash has a minimum thickness.

2. The apparatus in accordance with claim 1 wherein, in combination, said grooves in said upper and lower members are substantially circular in cross section.

3. The apparatus in accordance with claim 1 further comprises:
 a. a first carriage movable in a first direction;
 b. a second carriage movable in a second direction that is transverse to said first direction; and
 c. said feed eyes being integral with one of said carriages.

4. The apparatus in accordance with claim 1 wherein the glass fibers carried by said feed eyes are deposited along intersecting paths that define the periphery of openings, there being twice as many feed eyes as openings.

5. The apparatus in accordance with claim 1 wherein the glass fibers carried by said feed eyes are deposited along intersecting paths that define the periphery of openings, there being twice as many feed eyes plus one as openings whereby the finished article includes selvage.

* * * * *